United States Patent [19]

Frank et al.

[11] 4,026,850
[45] May 31, 1977

[54] THIXOTROPIC URETHANE ALKYD RESINS

[75] Inventors: Walter Frank; Karl Raichle; Eberhard Kreiss, all of Krefeld, Germany

[73] Assignee: Bayer Aktiengesellschaft, Germany

[22] Filed: Aug. 18, 1975

[21] Appl. No.: 605,721

[30] Foreign Application Priority Data

Aug. 22, 1974 Germany .......................... 2440267

[52] U.S. Cl. .................. 260/22 TN; 260/22 D; 260/33.6 UB
[51] Int. Cl.² ................. C08G 18/68; C08G 63/68; C09D 3/72; C09D 5/04
[58] Field of Search ..................... 260/22 D, 22 TN

[56] References Cited

UNITED STATES PATENTS

| 2,333,917 | 11/1943 | Christ et al. | 260/22 TN |
| 2,333,922 | 11/1943 | Foster | 260/22 TN |
| 3,249,563 | 5/1966 | Balk | 260/22 TN |
| 3,562,194 | 2/1971 | Offermann et al. | 260/22 EP |
| 3,650,999 | 3/1972 | Martins et al. | 260/22 D |
| 3,839,245 | 10/1974 | Schlossman et al. | 260/22 D |

FOREIGN PATENTS OR APPLICATIONS

| 1,813,950 | 9/1970 | Germany | 260/22 TN |
| 966,338 | 8/1964 | United Kingdom | 260/22 TN |

OTHER PUBLICATIONS

Chemical Abstracts, vol. 73, No. 20, Nov. 16, 1970, p. 100146c.

Primary Examiner—Ronald W. Griffin
Attorney, Agent, or Firm—Connolly & Hutz

[57] ABSTRACT

Thixotropic urethane alkyd resins which dry under oxidizing conditions, obtainable by reacting mixtures of:
a. OH-containing partial esters of polyhydric alcohols and long chain unsaturated fatty acids and/or OH-containing oligoesters of polyhydric alcohols, long chain unsaturated fatty acids and polybasic carboxylic acids;
b. OH-containing fatty acid modified dimeric fatty acid polyester amides; with
c. diisocyanates.

4 Claims, No Drawings

THIXOTROPIC URETHANE ALKYD RESINS

This invention relates to thixotropic urethane alkyd resins which dry under oxidizing conditions and which have been rendered thixotropic by the fatty acid modified dimeric fatty acid polyester amides incorporated therein.

"Urethane alkyd resins" within the meaning of this specification are alkyd resins which have been modified by fatty acids of drying oils and in which the polybasic carboxylic acid component has been partially or completely replaced by polyisocyanates (see D. H. Solomon, The Chemistry of Organic Film Formers, John Wiley & Sons, Inc., page 215).

It is an object of this invention that the advantages obtained by using thixotropic binders in lacquers, varnishes, paints and printing inks, such as prevention of sedimentation and flocculation of pigments and fillers, ease of application by brush coating, reduced tendency to drip from the brush and the thicker coats which can be obtained on vertical surfaces without dripping, should be made available for the binders belonging to the series of urethane alkyd resins without the disadvantages, such as incompatibility with the agent which renders the binder thixotropic or discolouration. In addition, the improved properties of urethane alkyd resins compared with those of alkyd resins, such as their rapid drying, hardness of films, abrasion resistance and good resistance to alkalis, should be completely preserved.

Thixotropic urethane alkyd resins which meet the requirements mentioned above cannot be prepared by the known methods of preparing thixotropic alkyd resins. When urethane alkyd resins are mixed with agents to render them thixotropic, based on condensates which contain amide or urethane groups, such as dimeric fatty acid polyamides, fatty acid modified dimeric fatty acid polyester amides or particular polyurethanes obtained from diisocyanates with alkyl groups adjacent to all the NCO-groups, the resulting binders are either incompatible or unsatisfactory in their thixotropic properties. Even combining the urethane alkyd resins with these agents at elevated temperatures of up to 150° C does not achieve the desired result. If urethane alkyd resins are mixed with thixotropic alkyd resins which have good compatibility, it is necessary to use such a high proportion of thixotropic alkyd resin in order to obtain distinct thixotropic properties that the binder mixtures no longer have the valuable properties of urethane alkyd resins. Processes by which incompatible thixotropic agents of the type mentioned above are incorporated in alkyd resins by heating the mixtures to temperatures of 200° C or higher cannot be applied to urethane alkyd resins because these resins are not stable under these heating conditions and give rise to dark-coloured products.

In the process for the production of thixotropic urethane oils described in German Offenlegungsschrift No. 1,813,950, the reaction of partial esters of polyhydric alcohols and long chain unsaturated fatty acids with polyvalent isocyanates which leads to the formation of urethane oils is carried out in the presence of polyamide resins. However, binders prepared by this process are not homogeneous and are just as cloudy as the incompatible mixtures of urethane oil with agents used to render them thixotropic. The same defect was also found in thixotropic urethane alkyd resins, which are obtained analogously to the above-mentioned urethane oils by reacting hydroxyl oligoesters which are obtained from polyhydric alcohols, long chain unsaturated fatty acids and polybasic carboxylic acids, with diisocyanates in the presence of polyamide resins. Lacquers based on thixotropic binders prepared in this way have practically no levelling flow when brush-coated and they dry to dull lacquer films with mat surfaces. These disadvantages are obviated by the thixotropic urethane alkyd resins according to the invention.

This invention relates to thixotropic urethane alkyd resins which dry under oxidizing conditions and in which fatty acid modified dimeric fatty acid polyester amides have been incorporated. They may be obtained by reacting mixtures of:

a. OH-containing partial esters of polyhydric alcohols and long chain unsaturated fatty acids and/or OH-containing oligoesters of polyhydric alcohols, long chain unsaturated fatty acids and polybasic carboxylic acids;

b. OH-containing fatty acid modified dimeric fatty acid polyester amides; and c. diisocyanates.

The invention also relates to a process for the preparation of the thixotropic urethane alkyd resins according to the invention, which is characterised in that mixtures of:

a. OH-containing partial esters of polyhydric alcohols and long chain unsaturated fatty acids and/or OH-containing oligoesters of polyhydric alcohols, long chain unsaturated fatty acids and polybasic carboxylic acids;

b. OH-containing fatty acid modified dimeric fatty acid polyester amides; and c. diisocyanates are reacted together.

The partial esters of polyhydric alcohols and long chain unsaturated fatty acids, as well as the OH-containing oligoesters obtainable from them by further esterification with polybasic carboxylic acids, are known from the preparation of alkyd resins and urethane alkyd resins which dry under oxidizing conditions (see H. Kittel, Lehrbuch der Lacke und Beschichtungen, Volume 1, part 2, pages 567–571 and D.H. Solomon, The Chemistry of Organic Film Formers, John Wiley & Sons, Inc., pages 214 and 215). They may be used either singly or as mixtures in any proportions.

Glycerol, trimethylol ethane, trimethylol propane, hexanetriol, pentaerythritol, dipentaerythritol and sorbitol are examples of polyhydric alcohols suitable for the preparation of the partial esters. Dihydric alcohols, such as ethylene glycol, propylene glycol, butanediol, hexanediol, perhydrogenated bisphenols, oxalkylated bisphenols and 1,4-hydroxymethyl-cyclohexane, may also be used in minor proportions.

Long chain unsaturated fatty acids suitable for the preparation of the partial esters include, e.g. the fatty acids of linseed oil, soya-bean oil, wood-oil, safflower oil, cotton seed oil, dehydrated castor oil and train oils, fractions of these fatty acids, tall oil fatty acids, and fatty acids obtained from the acids or their esters by conjugation or isomerization.

Suitable polybasic carboxylic acids include, for example trimellitic acid, orthophthalic acid, isophthalic acid, terephthalic acid, hexahydrophthalic acid, succinic acid, adipic acid, and sebacic acid.

In addition to the residues of long chain unsaturated fatty acids, the partial esters and oligoesters may also contain residues of other monocarboxylic acids, such as benzoic acid, tertiary butyl benzoic acid, 2-ethyl hexanoic acid or abietic acid.

The fatty acid modified dimeric fatty acid polyester amides which contain OH-groups are reaction products of dimeric fatty acid polyamides, fatty acid partial esters and/or mixtures of fatty acid esters and polyhydric alcohols which may be obtained by heating mixtures of the component to temperatures of from 190° to 230° C. The dimeric fatty acid polyester amides obtained by heating dimeric fatty acid polyamides with fatty acids and polyhydric alcohols to temperatures of from 150° to 210° C are equally suitable. Based on 1 mol of amide groups, they should contain from 0.1 to 1.5 and preferably from 0.25 to 0.7 mol of ester groups and from 0.2 to 0.9, preferably from 0.3 to 0.6 mol of hydroxyl groups, and they usually have an acid number below 20. These proportions are adjusted by suitable mixing the components.

If fatty acids and polyhydric alcohols are used, esterification takes place so that the ester group content of the reaction product is determined by the number of carboxyl groups introduced and the hydroxyl group content corresponds to the excess of hydroxyl groups in the polyhydric alcohol over the carboxyl groups.

If the proportions of ester groups, carboxyl groups and hydroxyl groups present are above the limits indicated, the reaction proceeds rapidly with increasing loss in thixotropic character, so that it is impossible to obtain fatty acid modified dimeric fatty acid polyester amides with reproducible qualities. Quantities below the indicated limits result in dimeric fatty acid polyester amides which either give rise to cloudy reaction products at the reaction temperatures employed for the preparation of the thixotropic urethane alkyd resins (50° –120° C) due to reaction in the homogeneous phase which in turn is to an excessively high softening point fatty acid content is too low, or which fail to be completely incorporated if the free OH-group content is too low.

The fatty acid modified dimeric fatty acid polyester amides prepared in this way are particularly effective in rendering the resins thixotropic. Even small proportions built into urethane alkyd resins result in a sufficiently thixotropic product so that the urethane alkyd resin character is not affected by the polyester amide content.

The dimeric fatty acid polyamides used for the preparation of the fatty acid modified dimeric fatty acid polyester amides are commercially available and may be prepared, as described in German Offenlegungsschrift No. 1,813,950, by condensation of dimerised unsaturated fatty acids, which may contain a proportion of trimeric fatty acids, with primary diamines such as ethylene diamine or hexamethylene diamine, if desired with the addition of monocarboxylic acids, which are preferably saturated, and monoamines. Dimeric fatty acid polyamides which have amine numbers and acid numbers below 10 and a molecular weight of about 2000 are preferred. The amine number expresses the amine equivalent per g of polyamide resin in mg of KOH.

The fatty acid esters used for the preparation of the fatty acid modified dimeric fatty acid polyester amides may by either naturally occurring triglycerides, such as coconut fat, ground nut oil, linseed oil, soya oil or safflower oil or the esters of the acids contained in them, or fractions of these acids, if desired acids obtainable from them by conjugation or isomerisation, or fatty acids obtained by paraffin oxidation with other alcohols, e.g. pentaerythritol, trimethylolpropane, neopentyl glycol, ethylene glycol, ethanol or methanol.

The fatty acids used in combination with the polyhydric alcohols may also be the fatty acids of the above-mentioned esters.

Suitable polyhydric alcohols for the introduction of the OH-groups into the polyester amides include, e.g., ethylene and diethylene glycol, propane-1,2-diol, butane-1,3- and -1,4-diol, neopentyl glycol, glycerol, trimethylol propane, hexanetriol, pentaerythritol and dipentaerythritol.

The fatty acid partial esters used may be reaction products of the above-mentioned fatty acids and polyhydric alcohols.

The fatty acid modified polyester amides which contain OH-groups are obtained by reacting the mixtures of polyamide fatty acid esters and polyhydric alcohols and mixtures of polyamides and partial esters, preferably at from 200° to 220° C, and the mixtures of polyamides, fatty acids and polyhydric alcohols, preferably at from 170° to 200° C. The reaction is preferably carried out under an inert gas atmosphere. The upper temperature region favours rapid reaction, but similtaneous loss in thixotropic character, whereas at temperatures in the lower range, the reaction is very slow. Conversion of the starting materials is usually completed afte a reaction time of about 10 hours. The lower the polyamide content, the more easily can the reaction be followed by observing the changes in compatibility in suitable solvents. Solvents which may be used for this purpose include long oil urethane alkyd resins dissolved in mineral spirits or long oil alkyd resins dissolved in dibutyl phthalate, e.g. 25%, by weight, of an alkyd resin obtained from 1 mol of linseed oil, 3 mol of glycerol and 3.5 mol of phthalic acid anhydride dissolved in dibutyl phthalate.

Preparation of the thixotropic urethane alkyd resins according to the invention may be carried out in a homogeneous melt or solution under the known conditions employed for urethane alkyd resins, by reacting:

a. 99 – 40 parts by weight of OH-containing partial esters of polyhydric alcohols and long chain unsaturated fatty acids and/or OH-containing oligoesters of polyhydric alcohols, long chain unsaturated fatty acids and polybasic carboxylic acids, both types of OH-compounds being referred to hereinafter as ester condensates;

b. 1 – 60 parts by weight of fatty acid modified dimeric fatty acid polyester amides which contain OH-groups; and c. such quantities of diisocyanate that the number of OH-groups in the reaction mixture is equal to or greater than the number of NCO-groups.

The OH-containing components (a) and (b) are preferably dissolved in each other by heating before the addition of isocyanate. If the products have a high viscosity, it is advantageous to add inert solvents, preferably aliphatic hydrocarbons, such as mineral spirits.

The reaction with the isocyanate is preferably carried out at temperatures of from 20° to 150° C, more preferably from 50° to 120° c.

The diisocyanates used may be aliphatic, cycloaliphatic or aromatic diisocyanates, e.g. hexamethylene-1,6-diisocyanate, isophorone diisocyanate, dicyclohexylmethane-4,4'-diisocyanate, 1-methyl cyclohexane-2,4- and -2,6-diisocyanate, tolylene-2,4- and -2,6-diisocyanate, diphenylmethane-4,4'-diisocyanate and mixtures of these isocyanates. Small proportions of monoisocyanates may also be included.

The quantity of dimeric fatty acid polyester amide incorporated in the products depends on the desired thixotropic properties. Products containing less than 10% by weight, based on the sum of components (a) to (c), can already be used as the sole thixotropic binders. Above 10% by weight the gels of such thixotropic urethane alkyd resins are very solid and can therefore be used in binder mixtures to render them thixotropic. Examples:

The dimeric fatty acid polyamides specified below were used in the following Examples. The dimeric fatty acid used was "DIMAC S" described in Karsten, Lackrohstofftabelle, Edition 5, page 72.

| Dimeric fatty acid polyamide | Components used for synthesis | Parts, by weight | Acid No. | Amine No. | Molecular weight |
|---|---|---|---|---|---|
| A | Dimeric fatty acid | 288 | | | |
| | Stearic acid | 139 | | | |
| | Ethylene diamine | 45 | 7 | 6 | approx. 2000 |
| B | Dimeric fatty acid | 288 | | | |
| | Soya oil fatty acid | 31.5 | | | |
| | Ethylene diamine | 33.5 | 6 | 5 | approx. 5000 |

The Table below shows the composition of the OH-containing ester condensates used in the Examples.

| Ester condensate | Components used for synthesis | Parts, by weight | Acid No. |
|---|---|---|---|
| 1 | Soya oil fatty acid | 560 | |
| | Pentaerythritol | 136 | 3 |
| 2 | Linseed oil | 872 | |
| | Glycerol | 138 | |
| | Phthalic acid anhydride | 118 | 1 |
| 3 | Linseed oil | 872 | |
| | Glycerol | 138 | |
| | Phthalic acid anhydride | 185 | 2 |
| 4 | Soya oil | 872 | |
| | Trimethylolpropane | 53.5 | |
| | Pentaerythritol | 136 | |
| | Phthalic acid anhydride | 103 | 1 |
| 5 | Soya oil | 872 | |
| | Trimethylolpropane | 53.5 | |
| | Pentaerythritol | 136 | |
| | Phthalic acid anhydride | 74 | 1 |

For product 1, preparation of the ester condensates was carried out by esterification at 200° C; for the other products it was carried out by alcoholysis of the oils and polyhydric alcohols after the addition of 0.02 % by weight of dibutyl tin dioxide under a nitrogen atmosphere at 220° C for 4 hours followed by esterification of the phthalic acid anhydride at 210° C until the given acid number was obtained.

The tolylene diisocyanate used in the Examples is a mixture of 65%, by weight of tolylene-2,4-diisocyanate and 35%, by weight, of tolylene-2,6-diisocyanate. The viscosities of the thixotropic urethane alkyd resins were determined according to DIN 53 211 after diluting 100 parts, by weight, with 40 parts, by weight, of m-cresol.

The thicknesses of the gels were determined at 20° C, using a "Rotovisko" manufactured by Haake (rotary blade diameter 1.6 cm, h 2.2 cm, 0.81 revs per min). To carry out the test, 50 parts, by weight, of thixotropic resin were diluted with 7.5 parts, by weight, of dimethylformamide at 100° C, left to stand overnight at room temperature and then tempered in a water bath at 20° C for 1 hour. Measured values = division on scale.

The viscosities of the lacquers were determined in the same apparatus, but using a PK 1 plate cone device, shearing gradient 4000 sec$^{-1}$.

In the following Examples the percentages are percentages by weight.

Example 1

The dimeric fatty acid polyester amide was prepared by heating 156.8 parts, by weight, of dimeric fatty acid polyamide A with 55.3 parts, by weight, of soya bean oil and 11.9 parts, by weight, of trimethylolpropane to 220° C for from 10 to 12 hours.

The dimeric fatty acid polyester amide is dissolved at 1154 parts, by weight, of ester condensate 4 at 140° C and the solution is tempered at 80° C after the addition of 1690 parts, by weight, of mineral spirits. 313 parts, by weight, of tolylene diisocyanate are then added and the reaction mixture is maintained at 80° C for 1 hour. The temperature is then raised to 100° C and the reaction mixture is left at this temperature until all the free isocyanate has disappeared.

The resulting urethane alkyd resin is clear and thixotropic. Gel thickness 100, viscosity corresponds to a time of outflow of 47 seconds.

A white lacquer is prepared by triturating the following components:

68 parts, by weight, of thixotropic urethane alkyd resin according to Example 1,
66 parts, by weight, of alkyd resin, oil content 68%, acid number below 10,
35 parts, by weight, of mineral spirits,
70 parts, by weight, of titanium dioxide pigment (Rutil),
2.50 parts, by weight, of methylethyl ketoxime, 55% in mineral spirits,
0.66 parts, by weight, of cobalt siccative, 6% Co
1.66 parts, by weight, of lead siccative, 24% Pb and 2.50 parts, by weight, of calcium siccative, 4% Ca;

and adjusting the triturate to a viscosity of about 400 cP with mineral spirits. The lacquer is thixotropic and has a gel thickness of 10 (determined after it has been left to stand overnight at 20° C) and it dries to a high gloss.

EXAMPLE 2

156.8 parts by weight of dimeric fatty acid polyamide A and 67.2 parts by weight of a partial ester mixture are heated to 220° C for from 10 to 12 hours. The partial ester mixture had been prepared by heating 872 parts by weight of soya-bean oil and 187 parts by weight of trimethylolpropane to 220° C with the addition of 0.02% by weight of dibutyl tin oxide.

The method is then continued as described in Example 1.

The resulting urethane alkyd resin is clear and thixotropic. Gel thickness above 100, viscosity corresponds to a time of outflow of 47 seconds.

EXAMPLE 3

156.8 parts by weight of dimeric fatty acid polyamide A are heated to 160° C for 20 hours with 52.8 parts by weight of soya oil fatty acid, 5.8 parts by weight of glycerol and 11.9 parts by weight of trimethylolpropane. The method is then continued as described in Example 1.

The urethane alkyd resin obtained is clear and thixotropic. Gel thickness 100, viscosity corresponds to a time of outflow of 42 seconds.

EXAMPLE 4

183 parts by weight of ester condensate 1, 26 parts by weight of the dimeric fatty acid polyester amide from Example 1 and 122 parts by weight of mineral spirits are dissolved at 120° C, tempered at 90° C and maintained at 90° C for 1 hour after the addition of 39 parts by weight of tolylene diisocyanate. After the addition of 43 parts by weight of mineral spirits, the mixture is heated at from 90° to 100° C for a further 2 hours, till it has been completely reacted.

The thixotropic urethane alkyd resin prepared is clear. Gel thickness 34, viscosity corresponds to a time of outflow of 45 seconds.

A white lacquer is prepared by triturating the following components:

Parts by weight:
83 thixotropic urethane alkyd resin according to Example 4
50 alkyd resin, oil content 68%, acid number below 10,
22 mineral spirits
70 titanium dioxide pigment (Rutil)
2.50 methylethyl ketoxime, 55% in mineral spirits,
0.66 cobalt siccative, 6% Co
1.66 lead siccative, 24% Pb and
2.50 calcium siccative, 4% Ca;

and then adjusting the triturate to a viscosity of about 400 cP with mineral spirits.

The lacquer is thixotropic with a gel thickness of from 6 to 8 (determined after it has been left to stand overnight at 20° C) and dried to a high gloss.

EXAMPLE 5

72.5 parts by weight of the polyamide heating product obtained in Example 1 ar dissolved in 586 parts by weight of ester condensate 3 at 140° C. 369 parts by weight of mineral spirits are added to the solution which is then maintained at 80° C for 1 hour after the addition of 78.5 parts by weight of tolylene diisocyanate. The reaction is then continued at 100° C.

The reaction product obtained is thixotropic and clear. Gel thickness 35, viscosity corresponds to a time of outflow of 34 seconds.

EXAMPLE 6

140 parts by weight of polyamide A and a mixture of 49.4 parts by weight of coconut fat and 10.6 parts by weight of trimethylolpropane are heated to 220° for 12 hours.

22.4 parts by weight of this heated mixture are dissolved in 115.4 parts by weight of ester condensate 4 at 140° C and the solution is diluted with 169.1 parts by weight of mineral spirits and then reacted at 80° C as described in Example 1 after the addition of 31.3 parts by weight of tolylene diisocyanate.

The resulting thixotropic urethane alkyd resin is clear. Gel thickness 100, viscosity corresponds to a time of outflow of 42 seconds.

EXAMPLE 7

140 parts by weight of dimeric fatty acid polyamide A are heated to 220° C for 12 hours with a mixture of 49.4 parts by weight of conjuen fatty acid methyl ester "Isomerginat SF" (see Karsten, Lackrohstofftabellen, 5th edition, page 69) and 10.6 parts by weight of trimethylolpropane.

22.4 parts by weight of the heated mixture are reacted as in Example 6 to produce a clear, thixotropic urethane alkyd resin. Gel thickness 50, viscosity corresponds to a time of outflow of 40 seconds.

EXAMPLE 8

90 parts by weight of dimeric fatty acid polyamide A are heated to 220° C with a mixture of 10 parts by weight of soya oil and 3 parts by weight of pentaerythritol for 16 hours.

36.4 parts by weight of the product are then dissolved in 230.8 parts by weight of ester condensate 4 at 140° C, diluted with 113.2 parts by weight of mineral spirits and maintained at 80° C for 30 minutes after the addition of 59.2 parts by weight of tolylene diisocyanate. After the addition of a further 113.2 parts by weight of mineral spirit, the temperature is raised from 80° C to 100° C after 30 minutes and maintained at this temperature until the reaction has been completed.

The clear, thixotropic product obtained has a gel thickness of 99 and a viscosity corresponding to a time of outflow of 45 seconds.

EXAMPLE 9

100 parts by weight of dimeric fatty acid polyamide A and a mixture of 84 parts by weight of soya-bean oil and 15.2 parts by weight of neopentyl glycol are heated to 220° C for 10 hours.

44 parts by weight of the heated product are dissolved in 222 parts by weight of ester condensate 2 at 140° C, diluted with 318 parts by weight of mineral spirits and reacted at 80° C as in Example 1 after the addition of 52 parts by weight of tolylene diisocyanate.

The clear, thixotropic product obtained has a gel thickness of 11 and a viscosity corresponding to a time of outflow of 20 seconds.

EXAMPLE 10

90 parts by weight of dimeric fatty acid polyamide A are heated to 220° C with a mixture of 10 parts by weight of soya-bean oil and 3 parts by weight of trimethylolpropane for 16 hours.

18 parts by weight, of the heated product are dissolved in 115.4 parts by weight of ester condensate 4° at 140° C, diluted with 81 parts by weight of mineral spirits and maintained at 80° C for 30 minutes after the addition of 29.6 parts by weight of tolylene diisocyanate. After the addition of a further 81 parts by weight of mineral spirits, the reaction mixture is maintained at 80° C for a further 30 minutes and then heated to 100° C until the reaction is completed.

The clear, thixotropic urethane alkyd resin obtained has a gel thickness of 71 and a viscosity corresponding to a time of outflow of 30 seconds.

EXAMPLE 11

15 parts by weight of the dimeric fatty acid polyester amide from Example 1 are dissolved in 112.6 parts by weight of ester condensate 5 at 140° C, diluted with 76 parts by weight of mineral spirits and maintained at 80° C for 1 hour after the addition of 25.2 parts by weight of hexamethylene diisocyanate. The reaction mixture is then further diluted with 76 parts by weight of mineral spirits and reacted to completion at 100° C.

The clear, thixotropic urethane alkyd resin has a gel thickness of 24 and a viscosity corresponding to a time of outflow of 28 seconds.

EXAMPLE 12

15 parts by weight of the dimeric fatty acid polyester amide from Example 1 are dissolved in 112.6 parts by weight of ester condensate 5 at 140° C and diluted with 158 parts by weight of mineral spirits. 31 parts by weight of isophorone diisocyanate are then added at 80° C. The temperature is raised to 100° C after 1 hour and maintained at this level until the reaction has been completed.

The reaction product is clear and thixotropic. Gel thickness 14, viscosity corresponds to a time of outflow of 24 seconds.

EXAMPLE 13

140 parts by weight of dimeric fatty acid polyamide B, 49.4 parts by weight of soya-bean oil and 10.6 parts by weight of trimethylolpropane are heated to 220° C for 10 hours.

22.4 parts by weight of the heated mixture are dissolved in 115.4 parts by weight of ester condensate 4 at 140° C, 166 parts by weight of mineral spirits are added, and after the addition of 27.8 parts by weight of tolylene diisocyanate the mixture is reacted first at 80° C for 1 hour and then at 100° C.

The clear reaction product obtained is thixotropic. Gel thickness 58, viscosity corresponds to a time of outflow of 46 seconds.

EXAMPLE 14

134 parts by weight of the dimeric fatty acid polyester amide from Example 1 are dissolved in 111.4 parts by weight of ester condensate 2 at 140° C, 138 parts by weight of mineral spirits are added and the mixture is heated to 90° C and maintained at that temperature for 20 minutes after the addition of 31.3 parts by weight of tolylene diisocyanate. 138 parts by weight of mineral spirits are then added at such a rate that the reaction temperature does not fall below 90° C. The reaction mixture is then heated to 100° C after a further 40 minutes, and maintained at this temperature until the reaction is complete.

The clear reaction product is highly thixotropic. Viscosity corresponds to a time of outflow of 22 seconds. Gel thicknesses:

| | |
|---|---|
| 50 parts by weight of resin + 7.5 parts by weight of dimethylformamide | above 100 |
| 50 parts by weight of resin + 20 parts by weight of dimethylformamide | 99 |

We claim:

1. A thixotropic urethane alkyd resin which dries under oxidizing conditions and is obtainable by reacting a mixture of:
   a. at least one member selected from the group consisting of OH-containing partial esters of polyhydric alcohols and long chain unsaturated fatty acids and OH-containing oligoesters of polyhydric alcohols, long chain unsaturated fatty acids and polycarboxylic acids and
   b. an OH-containing fatty acid modified dimeric fatty acid polyester amide containing from 0.1 to 1.5 mol of ester groups and from 0.2 to 0.9 mol of hydroxyl groups per mol of carbonamide groups with a diisocyanate in such amounts that the number of OH groups in the reaction is equal to or greater than the number of isocyanate groups.

2. The thixotropic urethane alkyd resin of claim 1 wherein said mixture comprises 99–40 parts by weight of (a) and 1–60 parts by weight of (b).

3. The thixotropic urethane alkyd resin of claim 1 wherein (b) is obtained by heating a mixture of dimeric fatty acid polyamide with at least one member selected from the group consisting of fatty acid partial esters and mixtures of fatty acid esters and polyhydric alcohols to a temperature of from 190° to 230° C.

4. The thixotropic urethane alkyd resin of claim 1 wherein (b) is obtained by heating a mixture of a dimeric fatty acid polyamide, a fatty acid and a polyhydric alcohol to a temperature of from 150° to 210° C.

* * * * *